United States Patent
You et al.

(10) Patent No.: US 8,620,745 B2
(45) Date of Patent: Dec. 31, 2013

(54) SELECTING ADVERTISEMENTS FOR PLACEMENT ON RELATED WEB PAGES

(75) Inventors: Siyu You, Beijing (CN); Peng Liu, Beijing (CN)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 13/381,037

(22) PCT Filed: Dec. 27, 2010

(86) PCT No.: PCT/CN2010/002175
§ 371 (c)(1),
(2), (4) Date: Dec. 27, 2011

(87) PCT Pub. No.: WO2012/088623
PCT Pub. Date: Jul. 5, 2012

(65) Prior Publication Data
US 2012/0191531 A1    Jul. 26, 2012

(51) Int. Cl.
*G06Q 30/00*    (2012.01)
(52) U.S. Cl.
USPC .................. 705/14.42; 705/14.41; 705/14.49; 705/14.4
(58) Field of Classification Search
USPC ...................................................... 705/14.42
See application file for complete search history.

(56) References Cited

U.S. PATENT DOCUMENTS

| | | | |
|---|---|---|---|
| 7,739,708 B2 | 6/2010 | Carson et al. | |
| 2007/0067294 A1 | 3/2007 | Ward et al. | |
| 2008/0275770 A1 | 11/2008 | Kitts | |
| 2009/0307018 A1* | 12/2009 | Chappell et al. | 705/5 |

FOREIGN PATENT DOCUMENTS

| | | |
|---|---|---|
| CN | 101097580 | 1/2008 |
| WO | 2009/073282 A2 | 6/2009 |

OTHER PUBLICATIONS

International Search Report and Written Opinion received for PCT Application No. PCT/CN2010/002175, mailed on Oct. 13, 2011, 10 Pages.

* cited by examiner

*Primary Examiner* — John G Weiss
*Assistant Examiner* — Scott C Anderson
(74) *Attorney, Agent, or Firm* — Nathan O. Greene; Brinks Gilson & Lione

(57) ABSTRACT

Systems and methods are described that select advertisements for placement on a series of consecutively-accessed web pages, such as consecutively-accessed web search results pages generated in response to a particular search. The systems and methods perform a separate advertisement ranking process to select advertisements for placement on each web page in the series of consecutively-accessed web pages at the time the web page is accessed. For web pages that follow the first web page in the series, the systems and methods utilize an advertisement ranking technique that calculates a probability that a user will select an advertisement based on certain user selection feedback features. The user selection feedback features for an advertisement are determined by comparing attributes of the advertisement to attributes of user-selectable items that were presented on one or more of the previously-accessed web pages in the series that are known to have been selected or not selected by the user.

20 Claims, 9 Drawing Sheets

SELECTING ADVERTISEMENTS FOR PLACEMENT ON RELATED WEB PAGES

REFERENCE TO EARLIER FILED APPLICATION

This application is a 371 national phase of PCT/CN2010/002175, filed Dec. 27, 2010, the disclosure of which is incorporated, in its entirety, by this reference.

BACKGROUND OF THE INVENTION

1. Field of the Invention

The present invention relates to systems and methods for selecting advertisements for placement on web pages, including but not limited to web pages used by a web search engine to deliver search results to a user.

2. Background

Addressing the information needs of users has been one of the main goals of web search engines since their early days. Web search engines can provide fast and accurate results to user queries, usually free of charge. However, in order to provide this searching service free of charge, search engine providers need to offer advertising opportunities that finance their operating costs. To this end, Web search engines and/or advertisement (ad) serving systems associated therewith may serve users a variety of different ad types, include banner ads, pop-up ads, and sponsored search ads, among others. These ads may be provided to users at various times and can be placed at various locations on a web page delivered to a user by the web search engine. Web search engine providers are often paid by the providers of the advertisements per user selection of each advertisement, e.g., per user click. Therefore, it is beneficial for the web search engine providers to maximize the interaction with, and thus the profit obtained from, each advertisement shown to the user.

Sponsored search ads are ads that are served on web pages used to deliver search results to a user in response to a user query and that relate in some manner to the user query. Since the spatial requirements needed to display all the search results corresponding to a given user query can exceed a single web page, a web search engine may deliver search results across a series of web search results pages that can be consecutively accessed by a user. For example, a user may receive a first web search results page in a series of web search results pages and then click on a "next" button to access a subsequent page in the series. Some web search engines deliver sponsored search ads across each web search results page in the series. In particular, a conventional approach to serving such sponsored search ads involves ranking all candidate ads based on a likelihood of each ad being selected by the user, and then placing a highest-ranking set of candidate ads on a first web search results page when accessed by the user, a next highest-ranking set of candidate ads on a second web search results page when accessed by the user, and so forth. It would be beneficial if the techniques used to select sponsored search ads for placement on each web search results page in a series of consecutively-accessed web search results pages could be improved in order to maximize user selection of such ads. By improving these techniques, users may be provided with improved access to more relevant sponsored search ads and the sponsored search ad revenue accruing to a web search engine provider may be increased.

BRIEF SUMMARY OF THE INVENTION

Systems and methods are described herein that select advertisements, such as sponsored search advertisements, for placement on a series of consecutively-accessed web pages, such as consecutively-accessed web search results pages generated in response to a particular search. The systems and methods perform a separate advertisement ranking process to select advertisements for placement on each web page in the series of consecutively-accessed web pages at the time the web page is accessed. For web pages that follow the first web page in the series, the systems and methods utilize an advertisement ranking technique that calculates a probability that a user will select an advertisement based on certain user selection feedback features. The user selection feedback features for an advertisement are determined by comparing attributes of the advertisement to attributes of user-selectable items that were presented on one or more of the previously-accessed web pages in the series that are known to have been selected or not selected by the user. In certain embodiments, these user-selectable items may comprise previously-presented sponsored search ads or search results. By leveraging such user selection feedback features to perform advertisement ranking for web pages that follow the first web page in the series, an embodiment can deliver more relevant advertisements to the user on such web pages. When the systems and methods are implemented in the context of a Web search engine, this can lead to increased advertising revenue for the provider of the Web search engine.

In particular, a method for selecting advertisements for placement on a series of related web pages is described herein. In accordance with the method, a plurality of advertisements is ranked to generate a ranked plurality of advertisements by at least using a first model to determine a probability of each advertisement being selected by a user if that advertisement is shown to the user on a first web page in a series of related web pages. One or more highest ranked advertisements are selected from the ranked plurality of advertisements for placement on the first web page. In response to the user requesting a second web page in the series of related web pages after accessing the first web page, a number of steps are performed. First, one or more user selection feedback features are obtained for each remaining advertisement in the plurality of advertisements that was not selected for placement on the first web page by comparing one or more attributes associated with each remaining advertisement to one or more attributes associated with one or more user-selectable items on the first web page that were selected by the user or one or more user-selectable items on the first web page that were not selected by the user. Then, the remaining advertisements are ranked to generate a ranked plurality of remaining advertisements by at least using a second model to determine a probability of each remaining advertisement being selected by the user if that remaining advertisement is shown to the user on the second web page, the probability associated with each remaining advertisement being determined based at least in part on the one or more user selection feedback features associated therewith. Finally, one or more highest ranked advertisements are selected from the ranked plurality of remaining advertisements for placement on the second web page.

A system for selecting advertisements for placement on a series of web search results pages is also described herein. The system includes a first ranking module, a second ranking module and an advertisement placement module. The first ranking module is configured to rank a plurality of advertisements to generate a ranked plurality of advertisements by at least using a first model to determine a probability of each advertisement being selected by a user if that advertisement is shown to the user on a first web search results page in the series of web search results pages. The advertisement placement module is configured to select one or more highest ranked advertisements from the ranked plurality of advertisements for placement on the first web search results page. The second ranking module is configured to rank remaining advertisements of the plurality of advertisements that were not selected for placement on the first web search results page to generate a ranked plurality of remaining advertisements by at least using a second model to determine a probability of each remaining advertisement being selected by the user if that remaining advertisement is shown to the user on a second web search results page in the series of web search results pages, the probability associated with each remaining advertisement being determined based at least in part on one or more user selection feedback features associated therewith. The second ranking module includes a user selection feedback feature generator that is configured to obtain the one or more user selection feedback features associated with each remaining advertisement by comparing one or more attributes associated with each remaining advertisement to one or more attributes associated with one or more user-selectable items on the first web search results page that were selected by the user or one or more user-selectable items on the first web search results page that were not selected by the user. The advertisement placement module is further configured to select one or more highest ranked advertisements from the ranked plurality of remaining advertisements for placement on the second web search results page.

A method for selecting advertisements for placement on a web search results page that follows one or more initial web search results pages in a series of web search results pages generated in response to a user query is also described herein. In accordance with the method, features associated with each of a plurality of advertisements that were not selected for placement on the initial web search results page(s) are obtained, the features including user selection feedback features determined by comparing one or more attributes associated with each advertisement in the plurality of advertisements to one or more attributes associated with one or more user-selectable items on the initial web search results page(s) that were selected by a user or one or more user-selectable items on the initial web search results page(s) that were not selected by the user. A user selection probability associated with each of the plurality of advertisements is determined based on the obtained features associated therewith. The plurality of advertisements is ranked based on the user selection probabilities. One or more of the plurality of advertisements are selected for placement on the web search results page based on the ranking.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 6:
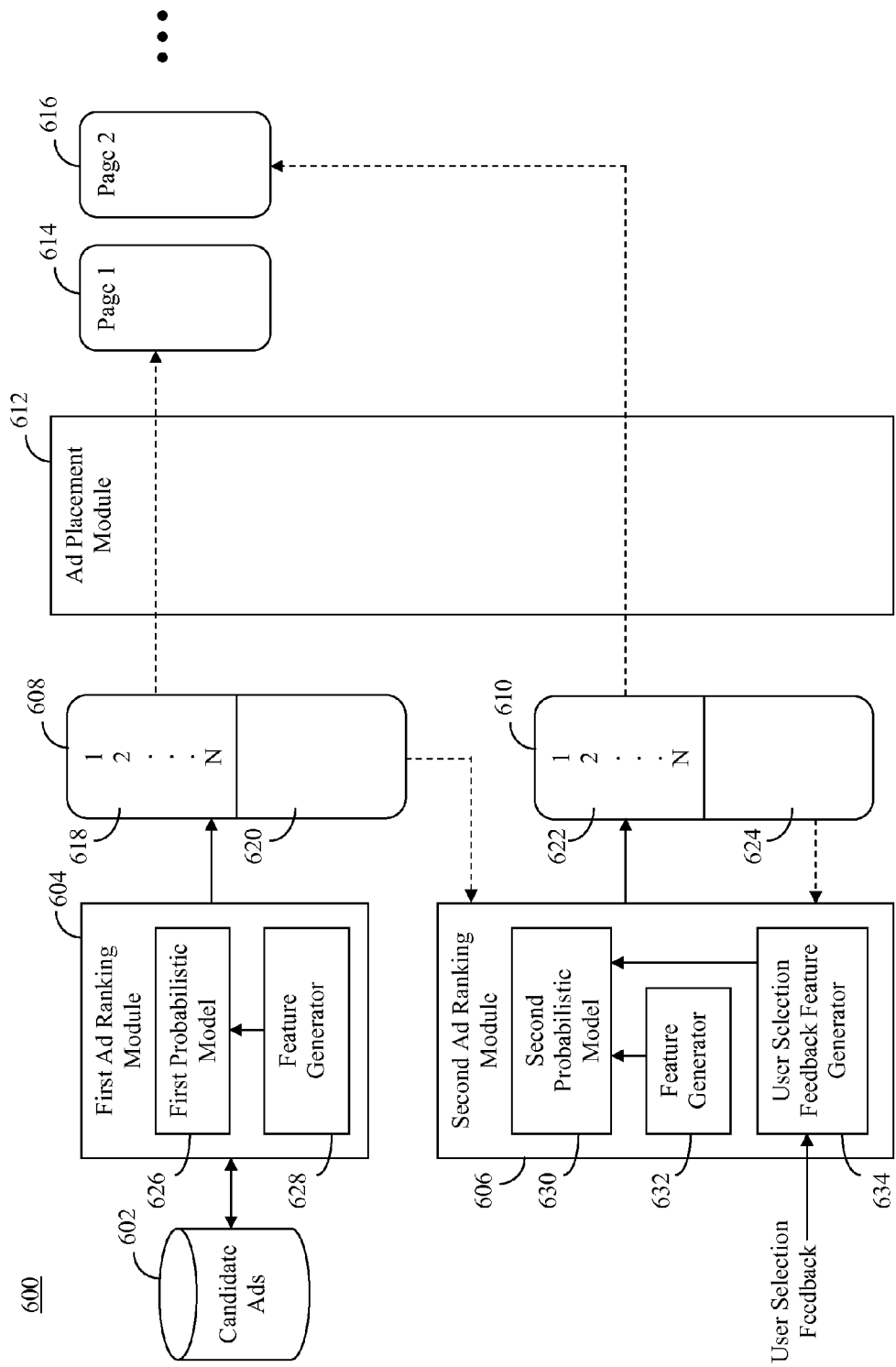

FIG. 6 is a block diagram of a search advertising system in accordance with an embodiment of the present invention that utilizes a first probabilistic model for selecting advertisements for placement on a first web search results page in a series of web search results pages associated with a user query and a second probabilistic model for selecting advertisements for placement on non-first web search results pages in the series of web search results pages.

Figure 7:
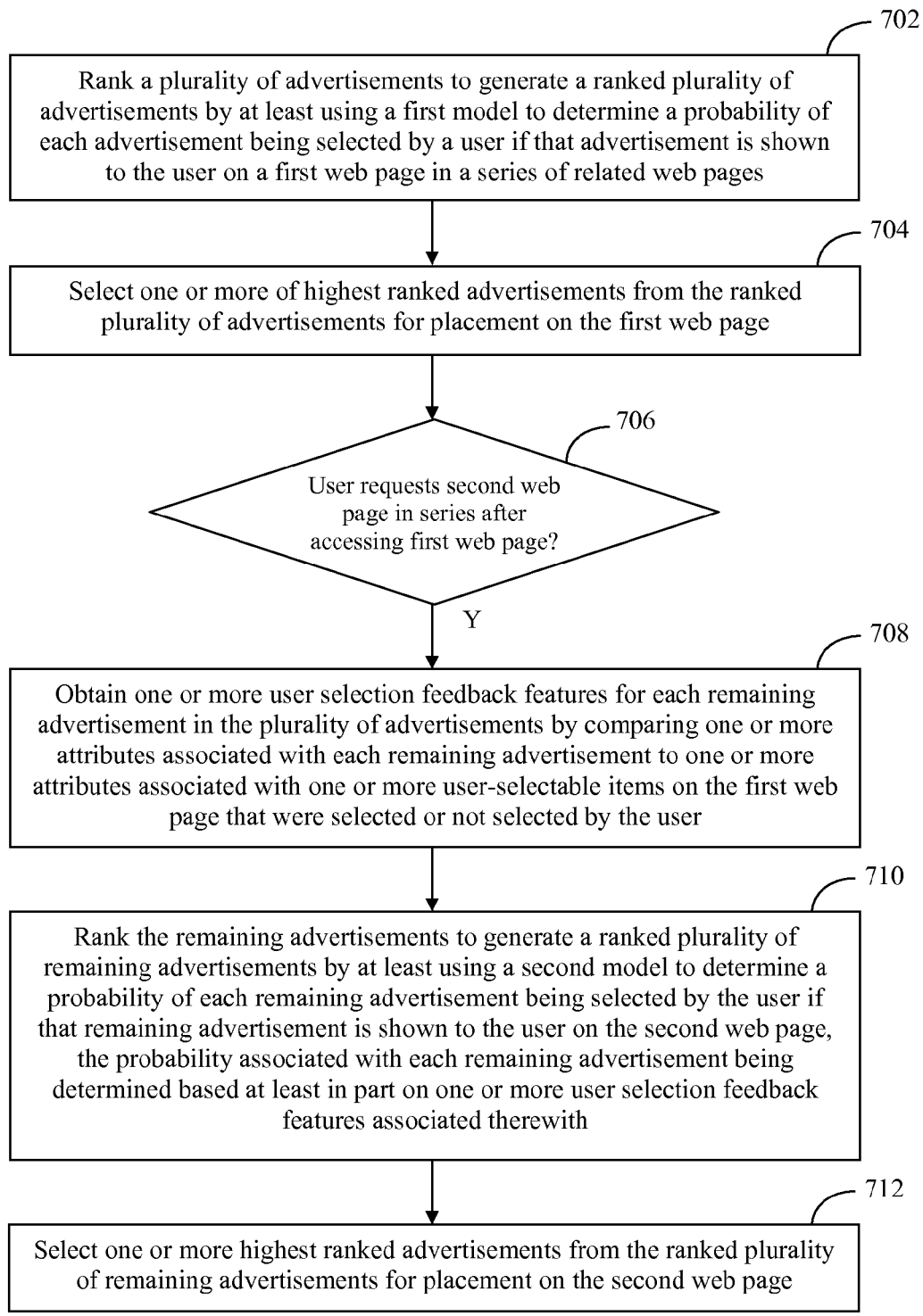

FIG. 7 depicts a flowchart of a method for selecting advertisements for placement on a first and second web page in a series of related web pages in accordance with an embodiment of the present invention.

Figure 8:
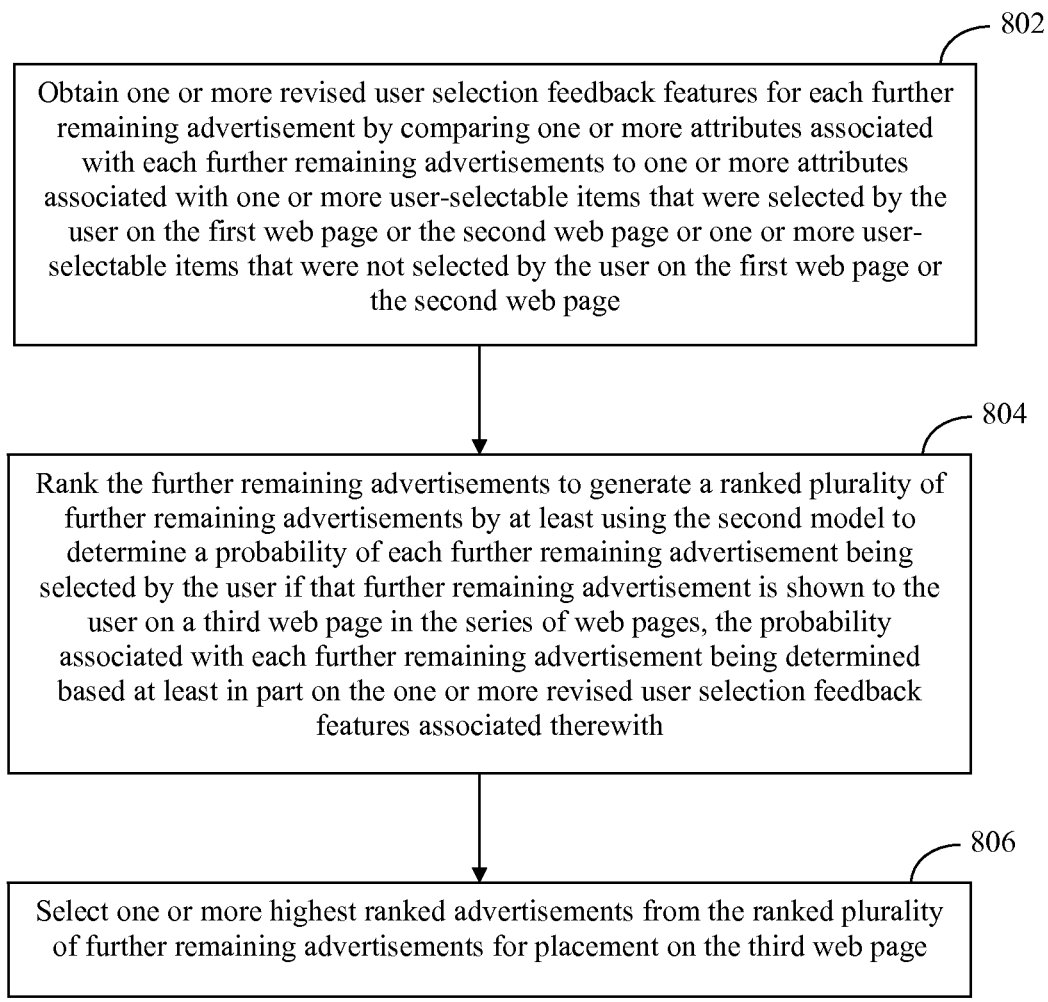

FIG. 8 depicts a flowchart of a method that includes additional steps that may be performed after the steps of the flowchart of FIG. 7 to select advertisements for placement on a third web page in the series of related web pages in accordance with an embodiment of the present invention.

Figure 9:
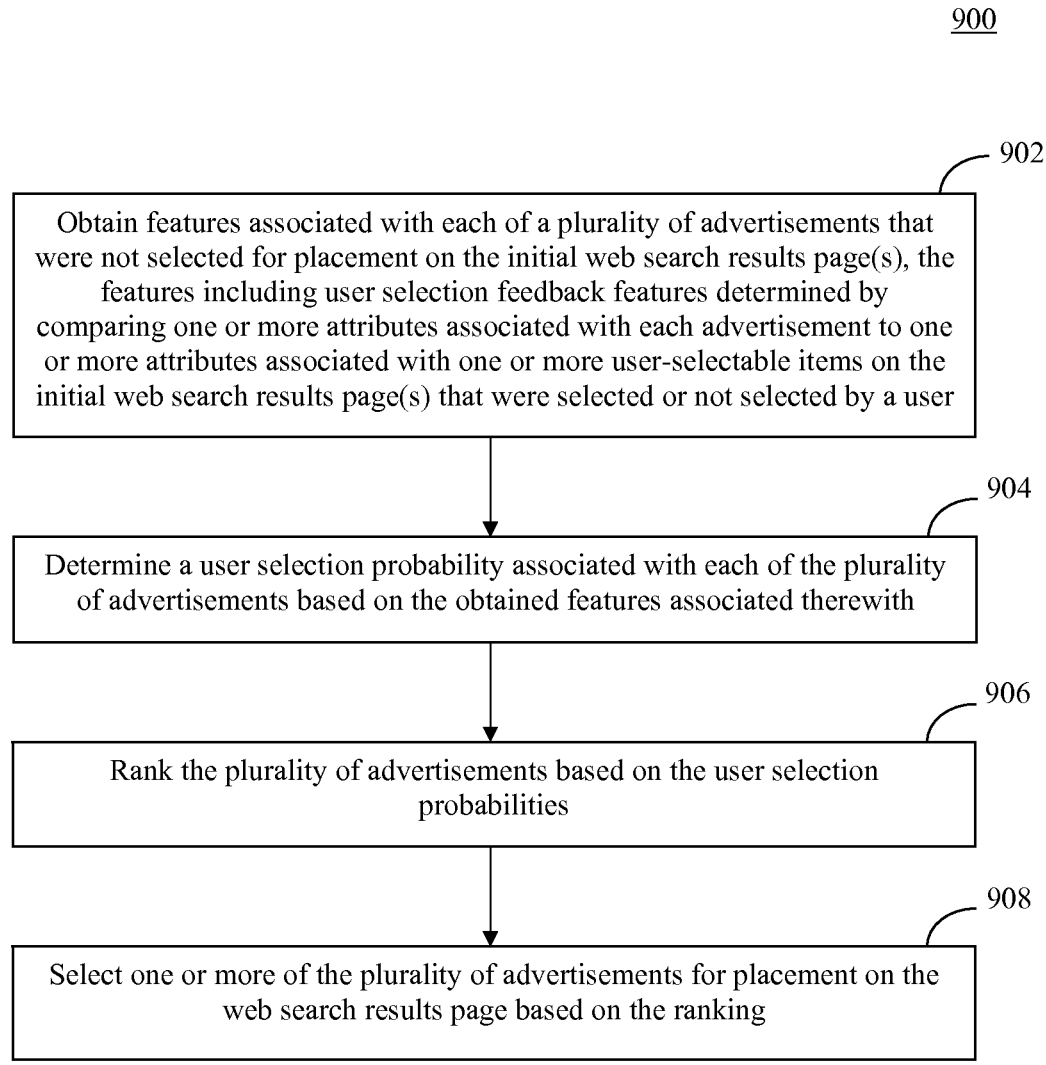

FIG. 9 depicts a flowchart of a method for selecting advertisements for placement on a web search results page that follows one or more initial web search results pages in a series of web search results pages generated in response to a user query in accordance with an embodiment.

Figure 10:
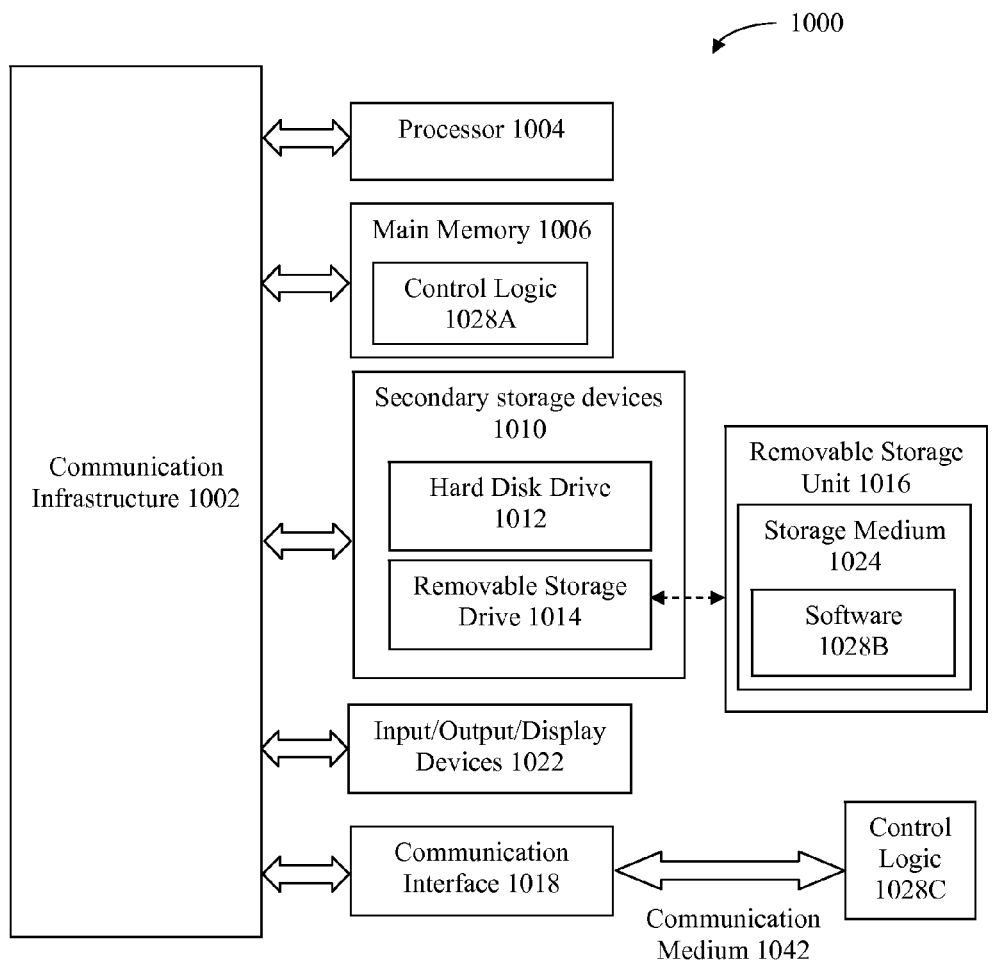

FIG. 10 is a block diagram of an example computer system that may be used to implement embodiments described herein.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

II. Example Operating Environment

Figure 1:
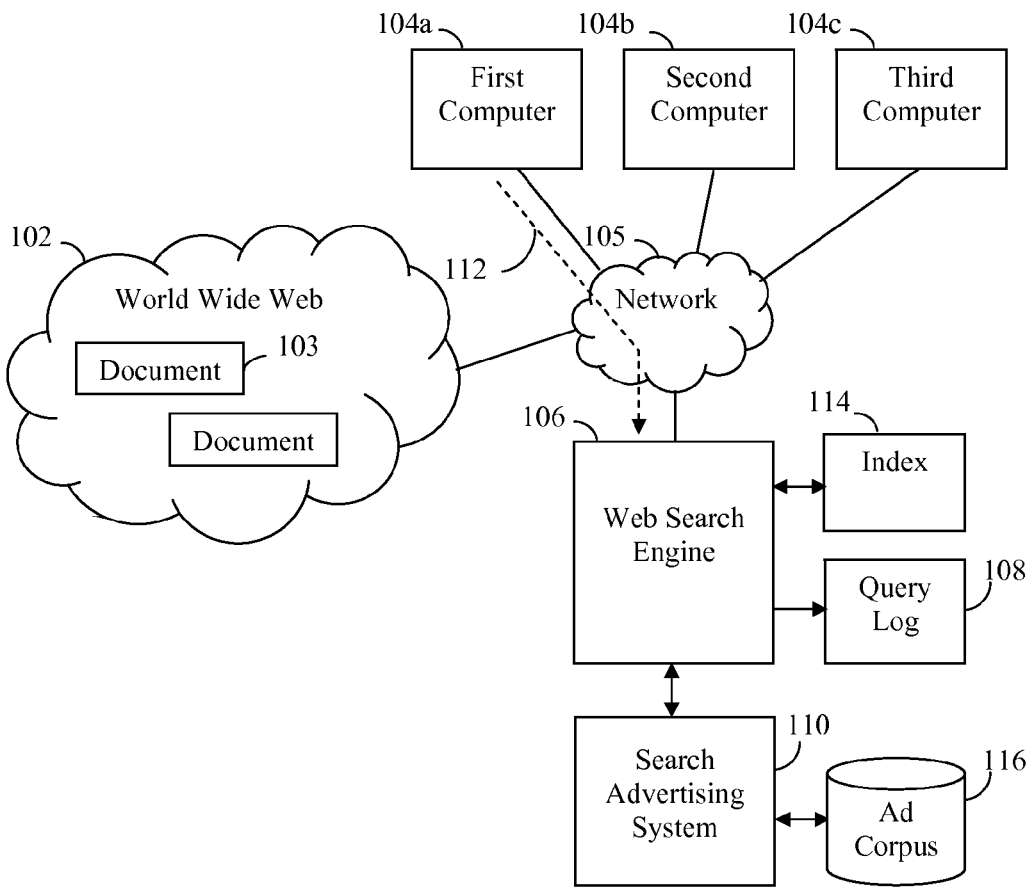
FIG. 1 is a block diagram of an information retrieval system in which an embodiment of the present invention may be implemented.

FIG. 1 is a block diagram of an information retrieval system 100 in which embodiments of the present invention may be implemented. System 100 is described herein for illustrative purposes only, and it is noted that embodiments of the present invention may be implemented in alternative environments. As shown in FIG. 1, system 100 includes a web search engine 106. One or more computers 104, such as first computer 104a, second computer 104b and third computer 104c, are connected to a communication network 105. Network 105 may be any type of communication network, such as a local area network (LAN), a wide area network (WAN), or a combination of communication networks. In embodiments, network 105 may include the Internet and/or an intranet. Computers 104 can retrieve documents from entities over network 105. In embodiments where network 105 includes the Internet, a collection of documents, including a document 103, which form a portion of World Wide Web 102, are available for retrieval by computers 104 through network 105. On the Internet, documents may be identified/located by a uniform resource locator (URL), such as http://www.yahoo.com, and/or by other mechanisms. Computers 104 can access document 103 through network 105 by supplying a URL corresponding to document 103 to a document server (not shown in FIG. 1).

As shown in FIG. 1, web search engine 106 is coupled to network 105. Web search engine 106 accesses a stored index 114 that indexes documents, such as documents of World Wide Web 102. A user of computer 104a who desires to retrieve one or more documents relevant to a particular topic, but does not know the identifier/location of such a document, may submit a query 112 to web search engine 106 through network 105. Web search engine 106 receives query 112 and analyzes index 114 to find documents relevant to query 112. For example, web search engine 106 may identify a set of documents indexed by index 114 that include terms of query 112. The set of documents may include any number of documents, including tens, hundreds, thousands, millions, or even billions of documents. Web search engine 106 may use a ranking function to rank documents of the retrieved set of documents in an order of relevance to the user. Documents of the set determined to most likely be relevant may be provided at the top of a list of the returned documents in an attempt to avoid the user having to parse through the entire set of documents. The list of the returned documents may be provided in the context of one or more documents termed "web search results pages" or simply "search results pages."

Web search engine 106 may be implemented in hardware, software, firmware, or any combination thereof. For example, web search engine 106 may include software/firmware that executes in one or more processors of one or more computer systems, such as one or more servers. Examples of web search engine 106 that are accessible through network 105 include, but are not limited to Yahoo! ® Search (www.yahoo.com), provided by Yahoo! Inc. of Sunnyvale, Calif., Bing™ (www-.bing.com), provided by Microsoft® Corporation of Redmond, Wash., and Google™ (www.google.com), provided by Google Inc. of Mountain View, Calif.

Figure 2:
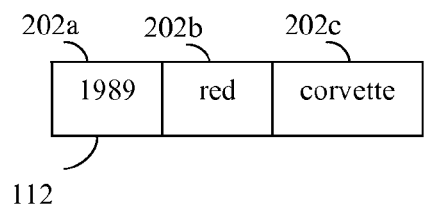
FIG. 2 shows an example query that may be submitted by a user to a web search engine.

FIG. 2 shows an example query 112 that may be submitted by a user of one of computers 104a-104c of FIG. 1 to web search engine 106. As shown in FIG. 2, query 112 includes one or more terms 202, such as first term 202a, second term 202b and third term 202c. Any number of terms 202 may be present in a query. As shown in FIG. 2, terms 202a, 202b and 202c of query 112 are "1989," "red," and "corvette," respectively. Web search engine 106 applies these terms 202a-202c to index 114 to retrieve a document locator, such as a URL, for one or more indexed documents that match "1989," "red," and "corvette," and may return a list of such document(s) and their associated URL(s), wherein the list is sorted in accordance with a ranking.

Figure 3:
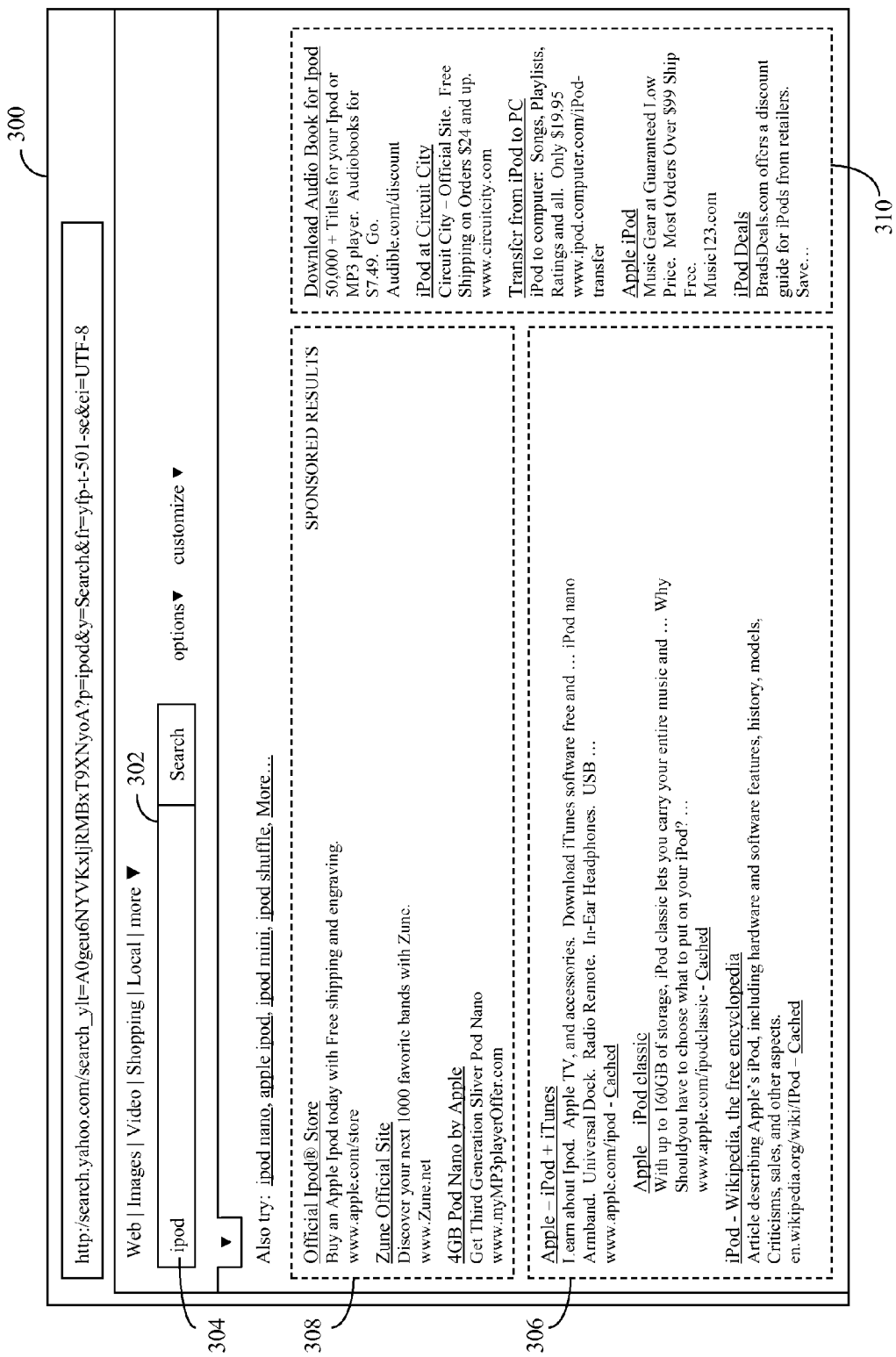
FIG. 3 depicts a first portion of an example web search results page that may include advertisements selected for display thereon by a search advertising system in accordance with an embodiment of the present invention.

FIG. 3 depicts a first portion 300 of an example web search results page that may be generated by web search engine 106 and delivered to a user of any of computers 104a-104c in response to receiving a query therefrom. First portion 300 may comprise a portion of a web search results page that is viewable via a web browser executing on any of computer 104a-104c. As shown in FIG. 3, first portion 300 includes a query text entry window 302 that includes a user-submitted query 304 comprising the query term "ipod." First portion 300 also includes a general search results section 306 that includes search results generated by web search engine 106 based on user-submitted query 304. Each search result may comprise, for example, a title associated with a web page, an abstract that summarizes the content of the web page, and a URL associated with the web page. The title may also comprise a hyperlink to the identified web page.

Figure 4:
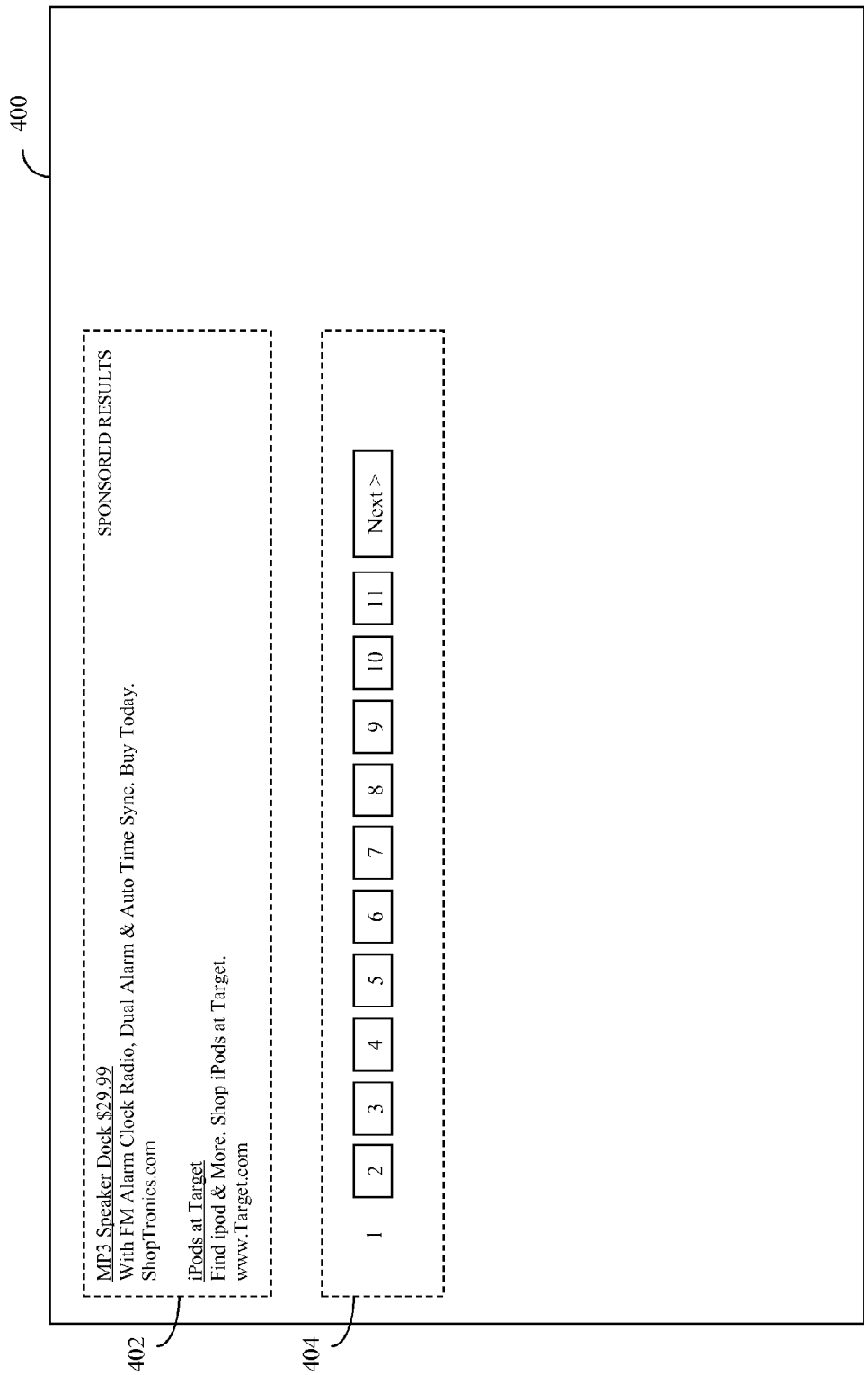
FIG. 4 depicts a second portion of the example web search results page shown in FIG. 3.

FIG. 4 depicts a second portion 400 of the example web search results page described above in reference to FIG. 3. Second portion 400 may comprise a portion of the web search results page that is viewable via a web browser executing on any of computer 104a-104c. For example, a user may access second portion 400 by using a "scroll down" function of the web browser after viewing first portion 300. As shown in FIG. 4, second portion includes a page access portion 404 that enables a user to access further web search results pages in a series of web search results pages that provides additional search results based on user-submitted query 304. For example, a user may select a particular page number to access a particular web search results page in the series or may select a "next" button to access the next web search results page in the series.

Returning now to the description of FIG. 1, web search engine 106 may generate a query log 108. Query log 108 is a record of searches that are performed using web search engine 106. Query log 108 may include a list of queries, by listing query terms (e.g., terms 202 of query 112) along with further information/attributes for each query, such as a list of documents identified based on the query, a list/indication of documents in the list that were selected/clicked on ("clicked") by a user reviewing the list, a ranking of clicked documents, a timestamp indicating when the query is received by web search engine 106, an IP (internet protocol) address identifying a unique device (e.g., a computer, cell phone, etc.) from which the query terms were submitted, an identifier associated with a user who submits the query terms (e.g., a user identifier in a web browser cookie), and/or further information/attributes.

As also shown in FIG. 1, system 100 also includes a search advertising system 110 that is communicatively connected to web search engine 106. Search advertising system 110 operates to select advertisements from an ad corpus 116 for inclusion within web search results pages generated and delivered to users of computers 104a-104c by web search engine 106. For example, with further reference to the example web search results page shown in FIGS. 3 and 4, search advertising system 110 may insert sponsored search ads retrieved from ad corpus 116 into a first sponsored search ad area 308, a second sponsored search ad area 310, and/or a third sponsored search ad area 402 includes in the web search results page depicted in FIGS. 3 and 4. Search advertising system 110 is configured to select advertisements that are deemed likely to be selected by a user when the web search results page is displayed thereto.

In a scenario in which a user consecutively accesses more than one web search results page generated in response to a user query (e.g., by selecting the "next" button or a numbered button associated with a particular web search results page in page access portion 404 of the example web search results page shown in FIG. 4), search advertising system 110 operates to select advertisements for inclusion within each web search results page prior to delivery to the user. As will be discussed in more detail herein, search advertising system 110 is configured to perform a separate advertisement ranking process to select advertisements for placement on each web search results page in the series of consecutively-accessed web search results pages at the time the web search results page is accessed. In particular, for web search results pages that follow the first web page in the series, search advertising system 110 utilizes an advertisement ranking technique that calculates a probability that a user will select an advertisement based on certain user selection feedback features. The user selection feedback features for an advertisement are determined by comparing attributes of the advertisement to attributes of user-selectable items that were presented on one or more of the previously-accessed web search results pages in the series that are known to have been selected or not selected by the user. In certain embodiments, these user-selectable items may comprise previously-presented sponsored search advertisements or search results. By leveraging such user selection feedback features to perform advertisement ranking for web search results pages that follow the first web search results page in the series, search advertising system 110 can deliver more relevant advertisements to the user on such web pages. This can lead to increased advertising revenue for the provider of web search engine 106.

Like web search engine 106, search advertising system 110 may be implemented in hardware, software, firmware, or any combination thereof. For example, search advertising system 110 may include software/firmware that executes in one or more processors of one or more computer systems, such as one or more servers. The foregoing ranking and advertisement placement techniques implemented by search advertising system 110 will now be described in more detail.

III. Example Advertisement Ranking and Placement Systems and Methods

Figure 5:
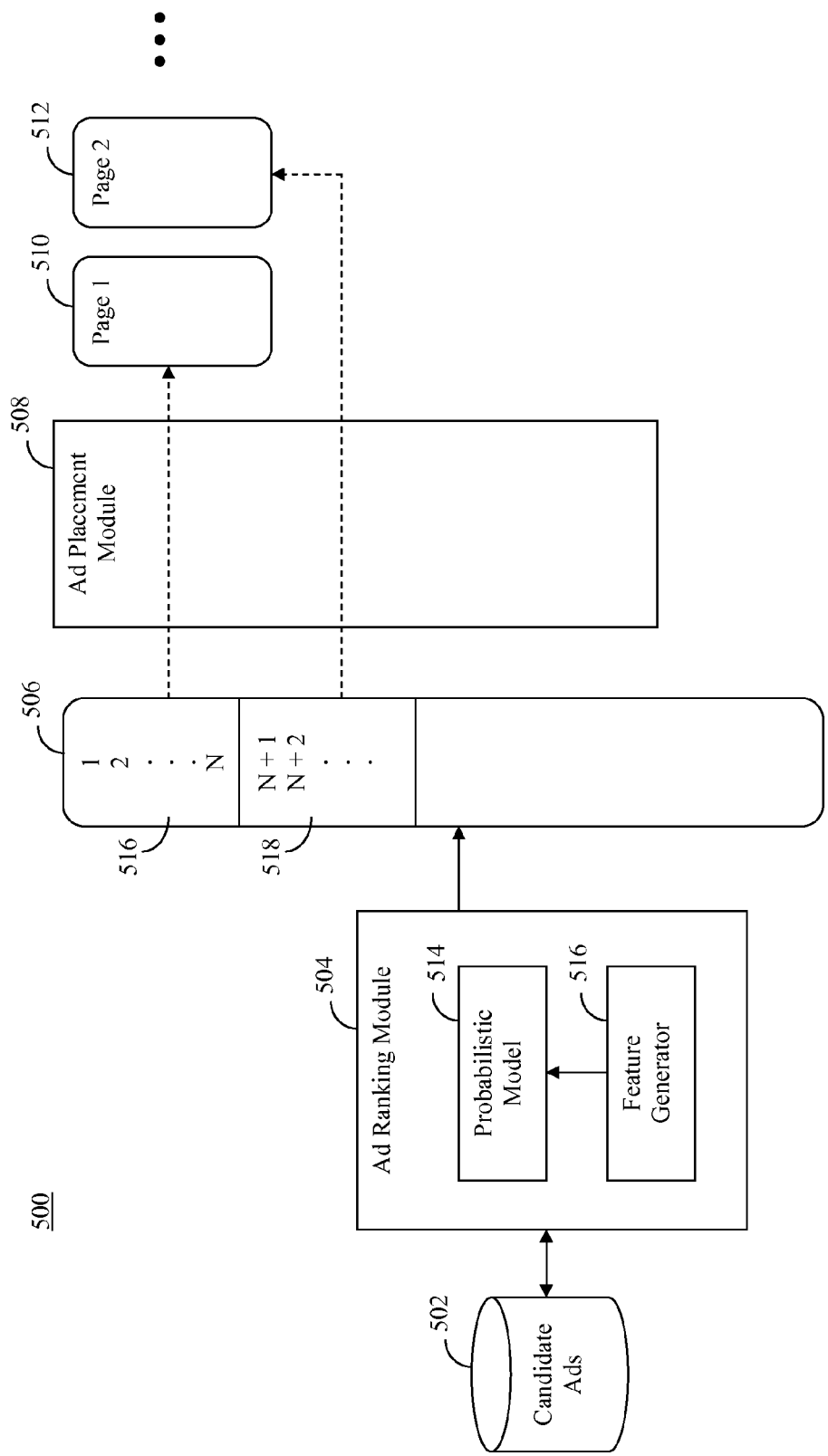
FIG. 5 is a block diagram of an example search advertising system that utilizes a uniform probabilistic model to select advertisements for placement on each web search results page in a series of web search results pages associated with a user query.

To better illustrate the approach used by an embodiment of the present invention for performing advertisement ranking and placement and the benefits thereof, a different approach will first be described. In particular, FIG. 5 is a block diagram of an example search advertising system 500 that utilizes the different approach. As shown in FIG. 5, search advertising system 500 includes an ad ranking module 504. Ad ranking module 504 operates to receive a plurality of candidate advertisements 502 that were identified by other elements of search advertising system 500 (not shown in FIG. 5) based at least on a query submitted by a user of a web search engine. For example, candidate advertisements 502 may represent advertisements that were identified as satisfying some minimum relevancy requirement with respect to the user-submitted query. Ad ranking module 504 ranks candidate advertisements 502 to produce a ranked advertisements list 506.

Ad ranking module 504 ranks candidate advertisements 502 by calculating an expected revenue score for each candidate advertisement and then sorting the candidate advertisements by expected revenue score. The expected revenue score represents, at least conceptually, the expected revenue that will be generated by placing such candidate advertisement on a web search results page to be generated and delivered to the user that submitted the user-submitted query. Ad ranking module 504 calculates the expected revenue score for a candidate advertisement by calculating a probability that the user who submitted the query will select (e.g., click on) the candidate advertisement when presented on a web search results page and by multiplying the calculated probability by a bid price associated with the candidate advertisement.

Ad ranking module 504 utilizes a probabilistic model 514 to calculate the probability that the user who submitted the query will select a candidate advertisement. Probabilistic model 514 may comprise, for example, a model obtained using any of a variety of well-known machine learning techniques such as maximum entropy modeling, hierarchical Bayesian modeling, or the like. Where machine learning is employed to obtain probabilistic model 514, probabilistic model 514 may be trained on historical data relating to the viewing, selection or non-selection of advertisements shown across all web search results pages in various series of web search results pages.

To facilitate application of probabilistic model 514 to candidate advertisements 502, ad ranking module 504 includes a feature generator 516 that generates various features in association with each candidate advertisement. Probabilistic model 514 analyzes the features associated with each candidate advertisement to determine the probability that the user who submitted the query will select the candidate advertisement. The features in the feature set considered by probabilistic model 514 and a weight accorded to each may be determined during training of probabilistic model 514. Such features may be obtained by comparing attributes associated with each candidate advertisement to attributes associated with the user-submitted query. For example, such features may be obtained by determining a textual similarity between text of each candidate advertisement and text of the user-submitted query. Such features may also be obtained by comparing attributes associated with each candidate advertisement to attributes associated with items viewed or interacted with by the user who submitted the query during prior search or browsing sessions.

As further shown in FIG. 5, search advertising system 500 includes an ad placement module 508. Ad placement module 508 operates to place advertisements included in ranked advertisements list 506 onto each web search results page in a series of web search results pages generated by a web search engine (not shown in FIG. 5) for delivery to the user, wherein such web search results pages include search results corresponding to the query submitted by the user. As shown in FIG. 5, ad placement module 508 operates by placing the first N advertisements 516 in ranked advertisements list 506 onto a first web search results page 510 to be delivered to the user. If the user requests another web search results page to obtain further search results associated with the user-submitted query, then ad placement module 508 places the next N advertisements 518 in ranked advertisements list 506 onto the next consecutively-accessed web search results page 512 as shown in FIG. 5.

One shortcoming of the approach to advertisement ranking and placement used by search advertising system 500 is that, since the approach ranks candidate advertisements 502 only once and prior to the user being delivered any web search results pages, probabilistic model 514 cannot possibly take into account important information that can be gleaned from how the user interacts with or ignores certain user-selectable items on previously-accessed web search results pages in the series of web search results pages delivered thereto. For example, when search advertising system 500 places ranked advertisements on second web search results page 512, the user may have already selected or ignored different user-selectable items on first web search results page 510, such as certain advertisements or search results. These user behaviors with respect to first web search results page 510 can reflect the likes, dislikes, preferences and interests of the user. However, there is no possible way that probabilistic model 514 can take such behaviors into account when performing the ranking function.

FIG. 6 is a block diagram of an example search advertising system 600 in accordance with an embodiment that overcomes the above-described shortcomings of search advertising system 600. In contrast to search advertising system 500 of FIG. 5, which utilizes a uniform probabilistic model to select advertisements for placement on all web search results page in a series of web search results pages associated with a user query, search advertising system 600 utilizes a first probabilistic model 626 for selecting advertisements for placement on a first web search results page in a series of web search results pages associated with a user query and a second, different, probabilistic model 630 for selecting advertisements for placement on non-first (e.g., second, third, fourth, and so on) web search results pages in the series of web search results pages. Thus, advertising system 600 uses a discriminating approach to estimating the probability that an advertisement will be selected by a user, wherein the discriminating approach discriminates between advertisements to be placed on a first web search results page in a series of web search results pages associated with a user query and non-first pages in the series.

As will be discussed in more detail below, second probability model 630 advantageously considers certain features associated with a candidate advertisement that are generated by comparing one or more attributes of the candidate advertisement to one or more attributes associated with a user-selectable item that a user has either selected or ignored when such item was presented to the user on a previously-accessed web search results page in a series of web search results pages. Second probability model 630 considers such features when ranking the candidate advertisement for potential placement on a subsequently-accessed web search results page in the series. By considering such user selection feedback features, second probability model 630 is able to leverage information about the user's own activities while viewing each of the previously-accessed web search results pages to improve user selection predictions for advertisements to be placed on the subsequently-accessed web pages.

In an embodiment, each of first probabilistic model 626 and second probabilistic model 630 comprise a model obtained using any of a variety of well-known machine learning techniques such as maximum entropy modeling, hierarchical Bayesian modeling, or the like. Where machine learning is employed to obtain first probabilistic model 626, first probabilistic model 626 may be trained on historical data relating to the viewing, selection or non-selection of advertisements shown only in the first web search results pages of various series of web search results pages, thereby increasing the chances that first probabilistic model 626 will perform well when used to calculate user selection probabilities associated with advertisements to be placed on first web search results pages. The feature set considered by first probabilistic model 626 may be the same as that considered by probabilistic model 514 as described above in reference to FIG. 5, although this is only an example.

Where machine learning is employed to obtain second probabilistic model 630, second probabilistic model 630 may be trained on historical data relating to the viewing, selection or non-selection of advertisements shown only in non-first web search results pages of various series of web search results pages, thereby increasing the chances that second probabilistic model 630 will perform well when used to calculate user selection probabilities associated with advertisements to be placed on non-first web search results pages. The feature set considered by second probabilistic model 630 includes certain user selection feedback features and may also include the same features considered by first probabilistic model 626 as discussed above. However this is only an example and second probabilistic model 630 may consider features other than those considered by first probabilistic model 626 in addition to the user selection feedback features.

The user selection feedback features considered by second probabilistic model 630 comprise features that reflect similarities or differences between one or more attributes of a candidate advertisement that is being considered for placement on a non-first web search results page in a series of web-search results pages and one or more attributes of a user-selectable item that was previously selected or ignored by the user when presented on a previously-accessed web search results page in the series. The user-selectable item may comprise, for example, a previously-presented advertisement or search result. One example of such a user selection feedback feature comprises a measure of similarity between text associated with a candidate advertisement and text associated with a user-selectable item that was selected or not selected by the user. Another example of such a user selection feedback feature comprises an indication of whether a candidate advertisement is associated with a network domain (e.g., an Internet domain) that is also associated with a user-selectable item that was selected or not selected by the user. These are only examples, however, and various other user selection feedback features may be obtained by comparing attributes associated with a candidate advertisement that is being considered for placement on a non-first web search results page in a series of web-search results pages to attributes of a user-selectable item that was previously selected or ignored by the user when presented on a previously-accessed web search results page in the series The various elements of search advertising system 600 and the manner in which such elements operate to perform advertisement ranking and placement operations associated with placing advertisements on web search results pages will now be described.

As shown in FIG. 6, search advertising system 600 includes a first ad ranking module 604. First ad ranking module 604 operates to receive a plurality of candidate advertisements 602 that were identified by other elements of search advertising system 600 (not shown in FIG. 6) based at least on a query submitted by a user of a web search engine. For example, candidate advertisements 602 may represent advertisements that were identified as satisfying some minimum relevancy requirement with respect to the user-submitted query. First ad ranking module 604 ranks candidate advertisements 602 to produce a ranked advertisements list 608.

In an embodiment, first ad ranking module 604 ranks candidate advertisements 602 by calculating an expected revenue score for each candidate advertisement and then sorting the candidate advertisements by expected revenue score. The expected revenue score may represent, at least conceptually, the expected revenue that will be generated by placing such candidate advertisement on a first web search results page to be generated and delivered to the user that submitted the user-submitted query. First ad ranking module 604 calculates the expected revenue score for a candidate advertisement by calculating a probability that the user who submitted the query will select (e.g., click on) the candidate advertisement when presented on a first web search results page in a series of web search results pages and by multiplying the calculated probability by a bid price associated with the candidate advertisement.

First ad ranking module 604 utilizes first probabilistic model 626 to calculate the probability that the user who submitted the query will select a candidate advertisement placed on the first web search results page. As noted above, first probabilistic model 626 may comprise a model obtained using any of a variety of well-known machine learning techniques such as maximum entropy modeling, hierarchical Bayesian modeling, or the like. As also noted above, where machine learning is employed to obtain first probabilistic model 626, first probabilistic model 626 may be trained on historical data relating to the viewing, selection or non-selection of advertisements shown only in the first web search results pages of various series of web search results pages, thereby increasing the chances that first probabilistic model 626 will perform well when used to calculate user selection probabilities associated with advertisements to be placed on first web search results pages.

To facilitate application of first probabilistic model 626 to candidate advertisements 602, first ad ranking module 604 includes a feature generator 628 that generates various features in association with each candidate advertisement. First probabilistic model 626 analyzes the features associated with each candidate advertisement to determine the probability that the user who submitted the query will select the candidate advertisement if the candidate advertisement is placed on the first web search results page. The features in the feature set considered by first probabilistic model 626 and a weight accorded to each may be determined during training of first probabilistic model 626. In one embodiment, such features are the same as the features considered by probabilistic model 514 as described above in reference to FIG. 5. Accordingly, such features may be obtained by comparing attributes associated with each candidate advertisement to attributes associated with the user-submitted query or by comparing attributes associated with each candidate advertisement to attributes associated with items viewed or interacted with by the user who submitted the query during prior search or browsing sessions.

As further shown in FIG. 6, search advertising system 600 includes an ad placement module 612. Ad placement module 612 operates to place advertisements included in ranked advertisements list 608 onto a first web search results page 614 in a series of web search results pages generated by a web search engine (not shown in FIG. 6) for delivery to the user, wherein such web search results pages include search results corresponding the query submitted by the user. As shown in FIG. 6, ad placement module 612 operates by placing the first N advertisements 618 in ranked advertisements list 608 onto first web search results page 614 to be delivered to the user, wherein N may be any positive integer. As shown in FIG. 6, all of the advertisements included in ranked advertisements list 608 that are not placed on first web search results page 614, which are designated remaining advertisements 620, are made available to a second ad ranking module 606.

If the user requests another web search results page to obtain further search results associated with the user-submitted query (e.g., by clicking on a "next" button or other user interface element on first web search results page 614), then second ad ranking module 606 is invoked to perform a new advertisement ranking operation. In particular, second ad ranking module 604 operates to receive remaining advertisements 620 that were not placed on first web search results page 614 and ranks such remaining advertisements 620 to produce a ranked advertisements list 610.

In an embodiment, second ad ranking module 606 ranks remaining advertisements 620 by calculating an expected revenue score for each remaining advertisement and then sorting the remaining advertisements by expected revenue score. The expected revenue score may represent, at least conceptually, the expected revenue that will be generated by placing such remaining advertisement on a non-first web search results page to be generated and delivered to the user that submitted the user-submitted query. Second ad ranking module 606 calculates the expected revenue score for a remaining advertisement by calculating a probability that the user who submitted the query will select (e.g., click on) the candidate advertisement when presented on a non-first web search results page in a series of web search results pages and by multiplying the calculated probability by a bid price associated with the remaining advertisement.

Second ad ranking module 606 utilizes second probabilistic model 630 to calculate the probability that the user who submitted the query will select a remaining advertisement placed on the non-first web search results page. As noted above, second probabilistic model 630 may comprise a model obtained using any of a variety of well-known machine learning techniques such as maximum entropy modeling, hierarchical Bayesian modeling, or the like. As also noted above, where machine learning is employed to obtain second probabilistic model 630, second probabilistic model 630 may be trained on historical data relating to the viewing, selection or non-selection of advertisements shown only in non-first web search results pages of various series of web search results pages, thereby increasing the chances that second probabilistic model 630 will perform well when used to calculate user selection probabilities associated with advertisements to be placed on non-first web search results pages.

To facilitate application of second probabilistic model 630 to remaining advertisements 620, second ad ranking module 606 includes a user selection feedback feature generator 634 that generates various user selection feedback features in association with each remaining advertisement. To perform this function, user selection feedback feature generator 634 receives information concerning certain user-selectable items that the user selected or did not select when presented to the user on first web search results page 614 (shown as "user selection feedback" in FIG. 6). User selection feedback feature generator 630 then compares one or more attributes associated with each remaining advertisement to one or more attributes associated with the user-selectable items that the user selected or did not select to generate the user selection feedback features associated with each remaining advertisement in remaining advertisements 620. Various examples of user selection feedback features were previously provided.

To further facilitate application of second probabilistic model 630 to remaining advertisements 620, second ad ranking module 606 also includes a feature generator 632 that generates various features in association with each remaining advertisement that are not user selection feedback features. In an embodiment, the features generated by feature generator 632 are the same as the features generated by feature generator 628, although this is only an example.

Second probabilistic model 630 analyzes the features associated with each remaining advertisement generated by user selection feedback generator 634 and feature generator 632 to determine the probability that the user who submitted the query will select the remaining advertisement if the candidate advertisement is placed on the non-first web search results page. The features considered by second probabilistic model 630 and a weight accorded to each may be determined during training of second probabilistic model 630.

As further shown in FIG. 6, search advertising system 600 operates to place advertisements included in ranked advertisements list 610 onto a second web search results page 616 in the series of web search results pages generated by the web search engine for delivery to the user, wherein such web search results pages include search results corresponding the query submitted by the user. As shown in FIG. 6, ad placement module 612 operates by placing the first N advertisements 622 in ranked advertisements list 610 onto second web search results page 616 to be delivered to the user, wherein N may be any positive integer. As shown in FIG. 6, all of the advertisements included in ranked advertisements list 610 that are not placed on second web search results page 616, which are designated further remaining advertisements 624, are made available to second ad ranking module 606.

As will be appreciated by persons skilled in the relevant art(s), if the user requests yet another web search results page to obtain further search results associated with the user-submitted query (e.g., by clicking on a "next" button or other user interface element on second web search results page 616), then second ad ranking module 606 can be invoked again to perform a new advertisement ranking operation which will then lead to the generation of a new ranked advertisements list that can be used to populate the additional web search results page. In this case, however, the user selection feedback used to generate the user selection feedback features can encompass information about user-selectable items that were selected or not selected by the user when presented on first web search results page 614 and second web search results page 616. In this manner, a new ad ranking operation for non-first web search results pages can be performed every time the user requests another in the series of web search results pages, wherein each new ad ranking operation may have access to even more user selection feedback.

As can be seen from the foregoing, the elements of search advertising system 600 operate in a manner that enables second probabilistic model 630 to mine user selection behaviors associated with previously-accessed web search results pages to improve advertisement selection predictions generated thereby. Such improved predictions can lead to improved ranking of advertisements for placements on second and later web search results pages in series of web search results pages associated with a user query. Such improved predictions can also lead to increased selections (e.g., clicks) of advertisements placed on second and later web search results pages in series of web search results pages associated with a user query.

A method for selecting advertisements for placement on a first and second web page in a series of related web pages in accordance with an embodiment of the present invention will now be described in reference to flowchart 700 of FIG. 7. The method of flowchart 700 may be implemented, for example, by search advertising system 600 as described above in reference to FIG. 6. However, the method is not implemented to that embodiment. Persons skilled in the relevant art(s) will appreciated that the method of flowchart 700 may be implemented in other systems, including other systems that place advertisements on related web pages.

As shown in FIG. 7, the method of flowchart 700 begins at step 702 in which a plurality of advertisements is ranked to generate a ranked plurality of advertisements by at least using a first model to determine a probability of each advertisement being selected by a user if that advertisement is shown to the user on a first web page in the series of related web pages. This step may be performed, for example, by first ad ranking module 604 of FIG. 6 that ranks candidate ads 602 to generate ranked advertisements list 608 by at least using first probabilistic model 626 to determine a probability of each candidate advertisement being selected by a user if that advertisement is shown to the user on first web search results page 614.

At step 704, one or more highest ranked advertisements are selected from the ranked plurality of advertisements for placement on the first web page. This step may be performed, for example, by ad placement module 612 of FIG. 6 that selects the N highest ranked advertisements 618 from ranked advertisements list 608 for placement on first web search results page 614.

At decision step 706, it is determined whether the user has requested a second web page in the series of related web pages after accessing the first web page. For example, with continued reference to FIG. 6, this step may comprise determining whether the user has requested second web search results page 616 after accessing first web search results page 614.

As further shown in FIG. 7, if the user has requested the second web page in the series of web pages after accessing the first web page, then control flows to step 708. At step 708, one or more user selection feedback features are obtained for each remaining advertisement in the plurality of advertisements that was not selected for placement on the first web page by comparing one or more attributes associated with each remaining advertisement to one or more attributes associated with one or more user-selectable items on the first web page that were selected by the user or one or more user-selectable items on the first web page that were not selected by the user. This step may be performed, for example, by user selection feedback feature generator 634 of FIG. 6 that obtains one or more user selection feedback features for each remaining advertisement in remaining advertisement 620 by comparing one or more attributes associated with each remaining advertisement to one or more attributes associated with one or more user-selectable items on first web search results page 614 that were selected by the user or one or more user-selectable items on first web search results page 614 that were not selected by the user.

Depending upon the implementation, the one or more user-selectable items that were selected or not selected by the user referred to in step 708 may include, for example, one or more advertisements selected for placement on the first web page or one or more search results included in the first web page.

In certain embodiments, step 708 may comprise determining a similarity between text associated with a remaining advertisement and text associated with at least one of the one or more user-selectable items on the first web page that were selected by the user or at least one of the one or more user-selectable items on the first web page that were not selected by the user. Furthermore, step 708 may comprise determining if a remaining advertisement is associated with a network domain that is also associated with at least one of the one or more user-selectable items on the first web page that were selected by the user or at least one of the one or more user-selectable items on the first web page that were ignored by the user.

At step 710, the remaining advertisements are ranked to generate a ranked plurality of remaining advertisements by at least using a second model to determine a probability of each remaining advertisement being selected by the user if that remaining advertisement is shown to the user on the second web page, the probability associated with each remaining advertisement being determined based at least in part on the one or more user selection feedback features associated therewith. This step may be performed, for example, by second ad ranking module 606 of FIG. 6 that ranks remaining advertisements 620 to generate ranked advertisements list 610 by at least using second probabilistic model 630 to determine a probability of each remaining advertisement being selected by the user if that remaining advertisement is shown to the user on second web search results page 616, the probability associated with each remaining advertisement being determined based at least in part on the one or more user selection feedback features associated therewith.

At step 712, one or more highest ranked advertisements are selected from the ranked plurality of remaining advertisements for placement on the second web page. This step may be performed, for example, by ad placement module 612 of FIG. 6 that selects the N highest ranked advertisements 622 from ranked advertisements list 610 for placement on second web search results page 616.

The method of flowchart 700 may include additional steps not shown in FIG. 7. By way of example, the method of flowchart 700 may include training the first model based on historical data relating to the selection or non-selection of user-selectable items displayed on first web pages in series of web pages used to provide search results to users. For example, such training was described above in reference to first probabilistic model 626 of FIG. 6. The method of flowchart 700 may also include training the second model based on historical data relating to the selection or non-selection of user-selectable items displayed on non-first web pages in series of web pages used to provide search results to users. For example, such training was described above in reference to second probabilistic model 630 of FIG. 6.

FIG. 8 depicts a flowchart 800 of a method that includes additional steps that may be performed after the steps of flowchart 700 to select advertisements for placement on a third web page in the series of related web pages referred to in flowchart 700 in accordance with an embodiment of the present invention. In particular, the steps of flowchart 800 may be performed in response to the user referred to in flowchart 700 requesting a third web page in the series of related web pages after accessing the second web page.

As shown in FIG. 8, the method of flowchart 800 begins at step 802, in which one or more revised user selection feedback features are obtained for each further remaining advertisement in the plurality of advertisements that was not selected for placement on the first web page or the second web page by comparing one or more attributes associated with each further remaining advertisements to one or more attributes associated with one or more user-selectable items that were selected by the user on the first web page or the second web page or one or more user-selectable items that were not selected by the user on the first web page or the second web page. This step may be performed, for example, by user selection feedback feature generator 634 of FIG. 6 that obtains one or more revised user selection feedback features for each further remaining advertisement in further remaining advertisements 624 by comparing one or more attributes associated with each further remaining advertisement to one or more attributes associated with one or more user-selectable items that were selected by the user on first web search results page 614 or second web search results page 616 or one or more user-selectable items that were not selected by the user on first web search results page 614 or second web search results page 616.

At step 804, the further remaining advertisements are ranked to generate a ranked plurality of further remaining advertisements by at least using the second model to determine a probability of each further remaining advertisement being selected by the user if that further remaining advertisement is shown to the user on a third web page in the series of web pages, the probability associated with each further remaining advertisement being determined based at least in part on the one or more revised user selection feedback features associated therewith. This step may be performed, for example, by second ad ranking module 606 of FIG. 6 which may rank further remaining advertisements 624 to generate a ranked plurality of further remaining advertisements by at least using second probabilistic model 630 to determine a probability of each further remaining advertisement being selected by the user if that further remaining advertisement is shown to the user on a third web page in the series of web pages, the probability associated with each further remaining advertisement being determined based at least in part on the one or more revised user selection feedback features associated therewith.

At step 806, one or more highest ranked advertisements are selected from the ranked plurality of further remaining advertisements for placement on the third web page. This step may be performed, for example, by ad placement module 612 of FIG. 6 which may select one or more highest ranked advertisements from the ranked plurality of further remaining advertisements for placement on a third web search results page in the series of web search results pages.

FIG. 9 depicts a flowchart 900 of a method for selecting advertisements for placement on a web search results page that follows one or more initial web search results pages in a series of web search results pages generated in response to a user query in accordance with an embodiment. Like the methods of flowcharts 700 and 800, the method of flowchart 900 may be implemented, for example, by search advertising system 600 as described above in reference to FIG. 6. However, the method is not implemented to that embodiment. Persons skilled in the relevant arts) will appreciated that the method of flowchart 900 may be implemented in other systems, including other systems that place advertisements on web search results pages.

As shown in FIG. 9, the method of flowchart 900 begins at step 902 in which features associated with each of a plurality of advertisements that were not selected for placement on the initial web search results page(s) are obtained, the features including user selection feedback features determined by comparing one or more attributes associated with each advertisement in the plurality of advertisements to one or more attributes associated with one or more user-selectable items on the initial web search results page(s) that were selected by a user or one or more user-selectable items on the initial web search results page(s) that were not selected by the user. This step may be performed, for example, by user selection feedback generator 634 of FIG. 6.

At step 904, a user selection probability associated with each of the advertisements is determined based on the obtained features associated therewith. This step may be performed, for example, by second probabilistic model 630 of FIG. 6.

At step 906, the advertisements are ranked based on the user selection probabilities. This step may be performed, for example, by second ad ranking module 606 of FIG. 6.

At step 908, one or more of the plurality of advertisements are selected for placement on the web search results page based on the ranking. This step may be performed, for example, by ad placement module of FIG. 6.

III. Example Computer System Implementations

Search advertising system 110, search advertising system 600, first ad ranking module 604, second ad ranking module 606, ad placement module 612 and any modules contained therein may be implemented in hardware, software, firmware, or any combination thereof. For example, search advertising system 110, search advertising system 600, first ad ranking module 604, second ad ranking module 606, ad placement module 612 and any modules contained therein may be implemented as computer program code configured to be executed in one or more processors. Alternatively, search advertising system 110, search advertising system 600, first ad ranking module 604, second ad ranking module 606, ad placement module 612 and any modules contained therein may be implemented as hardware logic/electrical circuitry.

The embodiments described herein, including systems, methods/processes, and/or apparatuses, may be implemented using well known servers/computers, such as a computer 1000 shown in FIG. 10. For example, search advertising system 110, search advertising system 600, first ad ranking module 604, second ad ranking module 606, ad placement module 612 and any modules contained therein may be implemented using one or more computers 1000.

Computer 1000 can be any commercially available and well known computer capable of performing the functions described herein, such as computers available from International Business Machines, Apple, Sun, HP, Dell, Cray, etc. Computer 1000 may be any type of computer, including a desktop computer, a server, etc.

Computer 1000 includes one or more processors (also called central processing units, or CPUs), such as a processor 1004. Processor 1004 is connected to a communication infrastructure 1002, such as a communication bus. In some embodiments, processor 1004 can simultaneously operate multiple computing threads.

Computer 1000 also includes a primary or main memory 1006, such as random access memory (RAM). Main memory 1006 has stored therein control logic 1028A (computer software), and data.

Computer 1000 also includes one or more secondary storage devices 1010. Secondary storage devices 1010 include, for example, a hard disk drive 1012 and/or a removable storage device or drive 1014, as well as other types of storage devices, such as memory cards and memory sticks. For instance, computer 1000 may include an industry standard interface, such a universal serial bus (USB) interface for interfacing with devices such as a memory stick. Removable storage drive 1014 represents a floppy disk drive, a magnetic tape drive, a compact disk drive, an optical storage device, tape backup, etc.

Removable storage drive 1014 interacts with a removable storage unit 1016. Removable storage unit 1016 includes a computer useable or readable storage medium 1024 having stored therein computer software 1028B (control logic) and/or data. Removable storage unit 1016 represents a floppy disk, magnetic tape, compact disk, DVD, optical storage disk, or any other computer data storage device. Removable storage drive 1014 reads from and/or writes to removable storage unit 1016 in a well known manner.

Computer 1000 also includes input/output/display devices 1022, such as monitors, keyboards, pointing devices, etc.

Computer 1000 further includes a communication or network interface 1018. Communication interface 1018 enables computer 1000 to communicate with remote devices. For example, communication interface 1018 allows computer 1000 to communicate over communication networks or mediums 1042 (representing a form of a computer useable or readable medium), such as LANs, WANs, the Internet, etc. Network interface 1018 may interface with remote sites or networks via wired or wireless connections.

Control logic 1028C may be transmitted to and from computer 1000 via the communication medium 1042.

Any apparatus or manufacture comprising a computer useable or readable medium having control logic (software) stored therein is referred to herein as a computer program product or program storage device. This includes, but is not limited to, computer 1000, main memory 1006, secondary storage devices 1010, and removable storage unit 1016. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable storage media may store program modules that include computer program logic for search advertising system 110, search advertising system 600, first ad ranking module 604, second ad ranking module 606, ad placement module 612 and any modules contained therein, flowchart 700, flowchart 800 and/or flowchart 900 (including any one or more steps of the flowcharts), and/or further embodiments of the present invention described herein. Embodiments of the invention are directed to computer program products comprising such logic (e.g., in the form of program code or software) stored on any computer useable medium. Such program code, when executed in one or more processors, causes a device to operate as described herein.

The invention can work with software, hardware, and/or operating system implementations other than those described herein. Any software, hardware, and operating system implementations suitable for performing the functions described herein can be used.

IV. Conclusion

While various embodiments of the present invention have been described above, it should be understood that they have been presented by way of example only, and not limitation. It will be apparent to persons skilled in the relevant art(s) that various changes in form and details may be made to the embodiments described above without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A computer-implemented method for selecting advertisements for placement on a series of related web pages, the method executable by a processor of a computing system and comprising:

ranking, using the processor, a plurality of advertisements to generate a ranked plurality of advertisements with a first model to determine a probability of each advertisement being selected by a user when that advertisement is shown to the user on a first web page in the series of related web pages;

selecting, using the processor, one or more highest ranked advertisements from the ranked plurality of advertisements for placement on the first web page; and in response to the user requesting a second web page in the series of related web pages after accessing the first web page, the processor:

obtaining one or more user selection feedback features for each remaining advertisement in the plurality of advertisements that was not selected for placement on the first web page by comparing one or more attributes associated with each remaining advertisement to one or more attributes associated with one or more user-selectable items on the first web page that were selected by the user;

ranking the remaining advertisements to generate a ranked plurality of remaining advertisements with a second model to determine a probability of each remaining advertisement being selected by the user when that remaining advertisement is shown to the user on the second web page, the probability associated with each remaining advertisement being determined based at least in part on the one or more user selection feedback features associated therewith; and selecting one or more highest ranked advertisements from the ranked plurality of remaining advertisements for placement on the second web page.

2. The method of claim 1, wherein the one or more user-selectable items that were selected by the user include one or more advertisements selected for placement on the first web page.

3. The method of claim 1, wherein the one more user-selectable items that were selected by the user include one or more search results included in the first web page.

4. The method of claim 1, wherein obtaining the one or more user selection feedback features for each remaining advertisement comprises:

determining a similarity between text associated with a remaining advertisement and text associated with at least one of the one or more user-selectable items on the first web page that were selected by the user.

5. The method of claim 1, wherein obtaining the one or more user selection feedback features for each remaining advertisement comprises:

determining when a remaining advertisement is associated with a network domain that is also associated with at least one of the one or more user-selectable items on the first web page that were selected by the user.

6. The method of claim 1, wherein using the first model to determine the probability of each advertisement being selected by the user when that advertisement is shown to the user on the first web page comprises analyzing a first feature set associated with each advertisement that includes features other than the one or more user selection feedback features; and wherein using the second model to determine the probability of each remaining advertisement being selected by the user when that remaining advertisement is shown to the user on the second web page comprises analyzing a second feature set associated with each remaining advertisement that includes the same features as the first feature set and the one or more user selection feedback features.

7. The method of claim 6, wherein the first feature set includes features determined by comparing one or more attributes associated with each advertisement to one or more attributes associated with a user-submitted query or one or more attributes associated with items viewed or interacted with by the user on web pages other than those in the series of related web pages.

8. The method of claim 1, further comprising:

training the first model based on historical data relating to the selection of user-selectable items displayed on first web pages in the series of related web pages used to provide search results to users.

9. The method of claim 8, further comprising:

training the second model based on historical data relating to the selection of user-selectable items displayed on non-first web pages in the series of related web pages used to provide search results to users.

10. The method of claim 1, further comprising, in response to the user requesting a third web page in the series of related web pages after accessing the second web page:

obtaining one or more revised user selection feedback features for each further remaining advertisement in the plurality of advertisements that was not selected for placement on the first web page or the second web page by comparing one or more attributes associated with each further remaining advertisement to one or more attributes associated with one or more user-selectable items that were selected by the user on the first web page or the second web page;

ranking the further remaining advertisements to generate a ranked plurality of further remaining advertisements by at least using the second model to determine a probability of each further remaining advertisement being selected by the user when that further remaining advertisement is shown to the user on a third web page in the series of related web pages, the probability associated with each further remaining advertisement being determined based at least in part on the one or more revised user selection feedback features associated therewith; and selecting one or more highest ranked advertisements from the ranked plurality of further remaining advertisements for placement on the third web page.

11. A processor-based system for selecting advertisements for placement on a series of web search results pages, the system comprising:

a first ranking module executable by a processor and configured to rank a plurality of advertisements to generate a ranked plurality of advertisements by using a first model to determine a probability of each advertisement being selected by a user when that advertisement is shown to the user on a first web search results page in the series of web search results pages;

an advertisement placement module executable by the processor and configured to select one or more highest ranked advertisements from the ranked plurality of advertisements for placement on the first web search results page;

a second ranking module executable by the processor and configured to rank remaining advertisements of the plurality of advertisements that were not selected for placement on the first web search results page to generate a ranked plurality of remaining advertisements by using a second model to determine a probability of each remaining advertisement being selected by the user when that remaining advertisement is shown to the user on a second web search results page in the series of web search results pages, the probability associated with each remaining advertisement being determined based at least in part on one or more user selection feedback features associated therewith, the second ranking module comprising:

a user selection feedback feature generator executable by the processor and configured to obtain the one or more user selection feedback features associated with each remaining advertisement by comparing one or more attributes associated with each remaining advertisement to one or more attributes associated with one or more user-selectable items on the first web search results page that were not selected by the user;

the advertisement placement module being further configured to select one or more highest ranked advertisements from the ranked plurality of remaining advertisements for placement on the second web search results page.

12. The system of claim 11, wherein the one or more user-selectable items that were not selected by the user comprise one or more advertisements selected for placement on the first web search results page.

13. The system of claim 11, wherein the one or more user-selectable items that were not selected by the user comprise one or more search results included in the first web search results page.

14. The system of claim 11, wherein the user selection feedback feature generator is configured to determine a similarity between text associated with a remaining advertisement and text associated with at least one of the one or more user-selectable items on the first web search results page that were not selected by the user.

15. The system of claim 11, wherein the user selection feedback feature generator is configured to determine when a remaining advertisement is associated with a network domain that is also associated with at least one of the one or more user-selectable items on the first web search results page that were not selected by the user.

16. The system of claim 11, wherein the first ranking module is configured to use the first model to determine the probability of each advertisement being selected by the user when that advertisement is shown to the user on the first web search results page by analyzing a first feature set associated with each advertisement that includes features other than the one or more user selection feedback features; and wherein the second ranking module is configured to use the second model to determine the probability of each remaining advertisement being selected by the user when that remaining advertisement is shown to the user on the second web search results page by analyzing a second feature set associated with each remaining advertisement that includes the same features as the first feature set and the one or more user selection feedback features.

17. The system of claim 16, wherein the first feature set includes features determined by comparing one or more attributes associated with each advertisement to one or more attributes associated with a user-submitted query or one or more attributes associated with items viewed or interacted with by the user on web pages other than those in the series of web search results pages.

18. A computer-implemented method for selecting advertisements for placement on a web search results page that follows one or more initial web search results pages in a series of web search results pages generated in response to a user query, the method executable by a processor of a computing system and comprising:

obtaining, using the processor, features associated with each of a plurality of advertisements that were not selected for placement on an initial web search results page, the features including user selection feedback features determined by comparing one or more attributes associated with each advertisement in the plurality of advertisements to one or more attributes associated with one or more user-selectable items on the initial web search results page that were selected by a user and one or more user-selectable items on the initial web search results page that were not selected by the user;

determining, using the processor, a user selection probability associated with each of the plurality of advertisements based on the obtained features associated therewith;

ranking, using the processor, the plurality of advertisements based on the user selection probabilities; and selecting, using the processor, one or more of the plurality of advertisements for placement on the web search results page other than the initial web search result page based on the ranking.

19. The method of claim 18, wherein the one or more user-selectable items on the initial web search results page(s) that were selected and not selected by the user comprise one or more advertisements placed on the initial web search results page(s).

20. The method of claim 18, wherein the one or more user-selectable items on the initial web search results page(s) that were selected and not selected by the user comprise one or more search results shown on the initial web search results page(s).

* * * * *